US009067603B2

(12) United States Patent
Kollberg et al.

(10) Patent No.: US 9,067,603 B2
(45) Date of Patent: Jun. 30, 2015

(54) ADAPTATIVE CRUISE CONTROL

(75) Inventors: Peter Kollberg, Floda (SE); Fredrik Sandblom, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 26 days.

(21) Appl. No.: 13/977,363

(22) PCT Filed: Dec. 29, 2010

(86) PCT No.: PCT/SE2010/000321
§ 371 (c)(1),
(2), (4) Date: Sep. 10, 2013

(87) PCT Pub. No.: WO2012/091637
PCT Pub. Date: Jul. 5, 2012

(65) Prior Publication Data
US 2014/0005908 A1 Jan. 2, 2014

(51) Int. Cl.
*B60T 7/12* (2006.01)
*B60W 30/16* (2012.01)
*B60W 10/06* (2006.01)
*B60W 10/184* (2012.01)
(Continued)

(52) U.S. Cl.
CPC ............. *B60W 30/162* (2013.01); *B60W 10/06* (2013.01); *B60W 10/184* (2013.01); *B60W 30/16* (2013.01); *B60W 2550/148* (2013.01); *B60W 2550/302* (2013.01); *B60W 2550/306* (2013.01); *B60W 2550/308* (2013.01); *B60W 2550/402* (2013.01); *B60W 2720/10* (2013.01); *G01S 13/726* (2013.01); *Y02T 10/84* (2013.01); *B60W 10/18* (2013.01); *B60W 2600/00* (2013.01)

(58) Field of Classification Search
CPC ........................................................ B60W 30/16
USPC ....................... 701/96; 342/70, 51, 42, 71–72; 180/167, 169
See application file for complete search history.

(56) References Cited

U.S. PATENT DOCUMENTS

| 5,629,851 | A | 5/1997 | Williams et al. |
| 6,816,084 | B2 | 11/2004 | Stein |
| 2006/0217866 | A1 | 9/2006 | Moebus |

FOREIGN PATENT DOCUMENTS

| DE | 102005046841 A1 | 4/2007 |
| DE | 102006056631 A1 | 6/2008 |

(Continued)

OTHER PUBLICATIONS

International Search Report (Sep. 22, 2011) for corresponding International application No. PCT/SE2010/000321.

(Continued)

*Primary Examiner* — Thomas G Black
*Assistant Examiner* — Luke Huynh
(74) *Attorney, Agent, or Firm* — WRB-IP LLP

(57) ABSTRACT

An adaptive cruise control system for a motor vehicle includes a forward looking object detecting arrangement for simultaneously detecting several target objects moving in the predicted path and adjacent paths of the equipped vehicle. The detecting arrangement is arranged to continuously monitor velocity and distance to each of the target objects, and a processing arrangement processes signals from the detecting means to provide information of distance to and relative speed of vehicles travelling in front of the equipped vehicle.

14 Claims, 1 Drawing Sheet

(51) Int. Cl.
*G01S 13/72* (2006.01)
*B60W 10/18* (2012.01)

(56) References Cited

FOREIGN PATENT DOCUMENTS

| | | |
|---|---|---|
| DE | 102007038059 A1 | 2/2009 |
| EP | 2251240 A1 | 11/2010 |
| FR | 2787586 A1 | 6/2000 |
| JP | 11059355 | 2/1999 |
| JP | 2006160111 | 6/2006 |
| JP | 2007102564 | 4/2007 |
| JP | 2009134455 | 6/2009 |
| WO | 2007069997 A1 | 6/2007 |
| WO | 2008004963 A1 | 1/2008 |
| WO | WO 2008004963 A1 * | 1/2008 |
| WO | 2008141859 A2 | 11/2008 |

OTHER PUBLICATIONS

International Preliminary Report on Patentability (Mar. 28, 2013) for corresponding International application No. PCT/SE2010/000321.
Japanese Official Action (Oct. 29, 2014) (translation) for corresponding Japanese Application 2013-547302.

* cited by examiner

ADAPTATIVE CRUISE CONTROL

BACKGROUND AND SUMMARY

The present invention relates, according to an aspect thereof, to an adaptive cruise control system for a motor vehicle comprising a forward looking object detecting means arranged to simultaneously detect several target objects moving in the predicted path and adjacent paths of the equipped vehicle. The means are further arranged to continuously monitor velocity and distance to each of said target objects.

It further comprises processing means arranged to process signals from said detecting means to provide information of distance to and relative speed of vehicles travelling in front of the equipped vehicle, wherein the processing means further is arranged to repeatedly generate velocity control signals based on the information of distance to and relative speed of vehicles travelling in front of the equipped vehicle. Also comprised is means to control velocity of the equipped vehicle in response to the control signals from the processing means.

The present invention also relates, according to an aspect thereof, to a method for adapting the velocity of a vehicle equipped with the above described system.

There are presently several adaptive cruise control systems, or autonomous cruise control systems, available for comfortably controlling a vehicle to keep a distance in time (nine-gap) to a leading vehicle. These systems generally use either a radar or laser setup allowing the vehicle to slow when approaching another vehicle and accelerate again to the preset speed when traffic allows. ACC technology is widely regarded as a key component of any future generations of intelligent cars. Laser-based systems are significantly lower in cost than radar-based systems; however, laser-based. ACC systems do not detect and track vehicles well in adverse weather conditions nor do they track extremely dirty (non-reflective) vehicles very well. Laser-based sensors must be exposed, the sensor (a fairly-large black box) is typically found in the lower grille offset to one side of the vehicle.

Radar-based sensors can be hidden behind plastic fascias, however, the fascias may look different from a vehicle without the feature. For example, some car producers package the radar behind the upper grille in the centre; however, the grille on such applications contains a solid plastic panel in front of the radar with painted slats to simulate the slats on the rest of the grille.

Single radar stems are the most common. Systems involving multiple sensors use either two similar hardware sensors, or one central long range radar coupled with two short radar sensors placed on the corners of the vehicle. There are of course all kinds of combinations available on the market.

From a fuel consumption perspective, performance may deteriorate if the lead vehicle brakes and accelerates more than the tolerance for deviating from the desired "time gap", as the equipped vehicle would then also brake and accelerate. The experience from this is a negative impact on the fuel consumption from such a system.

In order to solve the above mentioned problem several vehicles can be monitored at the same since the cruise control can be improved if several vehicles are tracked at the same time, allowing the equipped vehicle to avoid, braking/accelerating if it is likely to have to accelerate/brake again in a short time to compensate for the first action.

WO2007/069997 discloses an adaptive cruise control system where one or several vehicles are monitored in order to establish a distance value and a speed target value. The system compares the respective control order generated from the detection of an individual vehicle and selects the order that gives the slowest velocity.

In U.S. Pat. No. 5,629,851 is described an adaptive cruise control system where a sensor senses the distance to several vehicles in front of the equipped vehicle. Each detected vehicle is targeted and the most appropriate target is selected which normally is the closest target which is directly in the path of the equipped vehicle.

Further, U.S. Pat. No. 6,816,084 discloses an adaptive cruise control system for monitoring, several vehicles, wherein the surrounding environment is divided into at least one near zone and at least one distant zone. The position, e.g. lane, speed and distance of each monitored vehicle is determined in relation to a near and a distant zone. The speed is of the equipped vehicle is then adjusted based on the position. The system comprises at least two forward looking sensors for the different zones.

It is desirable to provide an adaptive cruise control system that aims at reducing the negative impact of lead vehicle behaviour by taking into account a group of leading and adjacent vehicles rather than just one. It is also desirable to provide a method for adapting the velocity of a vehicle taking into account a group of leading and adjacent vehicles rather than just one.

The adaptive cruise control system according to an aspect of the present invention for a motor vehicle comprises a forward looking object detecting means arranged to simultaneously detect several target objects moving in the predicted path and adjacent paths of the equipped vehicle. The means are further arranged to continuously monitor velocity and distance to each of said target objects. The system also comprises processing means arranged to process signals from said detecting means to provide information of distance to and relative speed of vehicles travelling in front of the equipped vehicle, wherein the processing means further is arranged to repeatedly generate velocity control signals based on the information of distance to and relative speed of vehicles travelling in front of the equipped vehicle. Means to control velocity of the equipped vehicle in response to the control signals from the processing means is also comprised in the adaptive cruise control system.

The processing means is further arranged to calculate a distance in time from the equipped vehicle to a virtual target vehicle, the distance to and velocity of said virtual target vehicle calculated on basis of the number of vehicles in said group, the spread in distance of the group, and thus the vehicle density of said group, and the variability of positions in the group. The algorithm of the processing means decides from the above parameters on the allowed deviations in time distance, wherein the processing means is arranged to produce a signal to the means for controlling the velocity of the equipped vehicle that is based on the calculated distance in time between the equipped vehicle and said virtual vehicle.

Preferably, the angle is monitored as well as the lateral distance. The monitored vehicles can in the system or method be considered as velocity vectors.

The idea according to an aspect of the invention is to track several vehicles at the same time and use all of them of adaptive cruise control purposes instead of just selecting one of them. A group of targets is more likely to behave "smoother" than a single individual vehicle and the method/system tries to asses this smoothness. Actions that, if unknown, would cause the equipped vehicle to perform actions that would soon have to be corrected, are predicted and considered when controlling the equipped vehicle. The motions of individual vehicles in a group are believed to be highly correlated. Also, all vehicles in a group are not necessarily considered to be equally "important" but are preferably weighted based on for instance distance and speed.

Preferably the signal produced by the processing means to the means for controlling the velocity represents a value of the desired velocity.

In a preferred embodiment of the present invention the processing means is configured to calculate the covariance for all target objects within the detected group, which covariance is used in the algorithm for predicting the behaviour of the virtual target vehicle.

In another preferred embodiments of the present invention the virtual target vehicle is derived to have eco-driving properties.

In yet another embodiment of the present invention the object detecting means comprises a radar unit or a LIDAR unit or a camera unit for establishing a distance value and a velocity value for each of the detected target objects. LIDAR (Light Detection And Ranging) is an optical remote sensing technology that measures properties of scattered light to find range and/or other information of a distant target. The prevalent method to determine distance to an object or surface is to use laser pulses. Like the similar radar technology, which uses radio waves, the range to an object is determined by measuring the time delay between transmission of a pulse and detection of the reflected signal. The term "laser radar" is also in use even though LIDAR does not employ microwaves or radio waves, which is definitional to radar.

Preferably sensors are provided to measure a condition of the road surface. If for instance the road is icy the control signal for the velocity should be based also on a risk analysis with regard to a decreased friction between wheels and road rather than just the velocity of vehicles in front of the equipped vehicle.

Also preferred is an adaptive cruise control system wherein the means to control velocity of the equipped vehicle in response to the control signals from the processing means comprises an engine control means and a brake control means.

Preferably, the adaptive cruise control system further comprises or is combined with a pre-crash system. Such a system warns the driver and/or provides brake support if there is a high risk of a collision. Also, in certain vehicles it is preferred to also have a lane maintaining system which provides power steering assist to reduce steering input burden in corners when the cruise control system is activated.

In a further embodiment the adaptive cruise control system is aided by a GPS. The GPS navigation system provides guidance input to the adaptive cruise control system. For example, on the motorway, the vehicle just in front is slowing down, but with turn signal on and it is actually heading for a highway off-ramp. Normally the adaptive cruise control system would sense the car in front was decelerating and it would simply apply brakes accordingly to slow the equipped vehicle. But a GPS-guided adaptive cruise control system takes into account the approaching highway exit and it simultaneously receives images from a camera. The camera can detect the turn signal from the car ahead. So instead of braking, this new system continues uninterrupted, because it knows that the car in front will exit the lane. For the navigation system it is possible to use various types of map databases. Also, the invention is not limited to the GPS system, other systems could be used. For instance, the Russian GLObal NAvigation Satellite System (GLONASS), the Chinese Compass navigation system or the Galileo positioning system of the European Union.

According to a first embodiment of the method of the present invention for controlling the velocity of a motor vehicle equipped with an adaptive cruise control system, it comprises simultaneously detecting several target objects moving in the predicted path and adjacent paths of the equipped vehicle with a forward looking object detecting means. Further, continuously monitoring velocity and distance to each of said target objects, processing with a processing means the signals from the detecting means to provide information of distance to and relative speed of vehicles travelling in front of the equipped vehicle, using the processing means for repeatedly generating velocity control signals based on the information of distance to and relative speed of vehicles travelling in front of the equipped vehicle, and controlling the velocity of the equipped vehicle in response to the control signals from the processing means.

The method further comprises calculating a distance in time from the equipped vehicle to a virtual target vehicle, the distance to and velocity of said virtual target vehicle calculated on basis of the number of vehicles in said group, the spread in distance of the group, and thus the vehicle density of said group, and the variability of positions in the group, deciding from the above parameters with the algorithm of the processing means on the allowed deviations in time distance, and finally producing a signal with the processing means to the means for controlling the velocity of the equipped vehicle that is based on the calculated distance in time between the equipped vehicle and said virtual vehicle.

BRIEF DESCRIPTION OF FIGURES

The system and method according to the present invention is explained below it more detail with reference to the figures.

DETAILED DESCRIPTION

The system and method according to an aspect the invention will be explained with reference made to the enclosed figures. The examples are chosen in order to facilitate the reading and understanding of the system and method according to the present invention.

Figure 1:
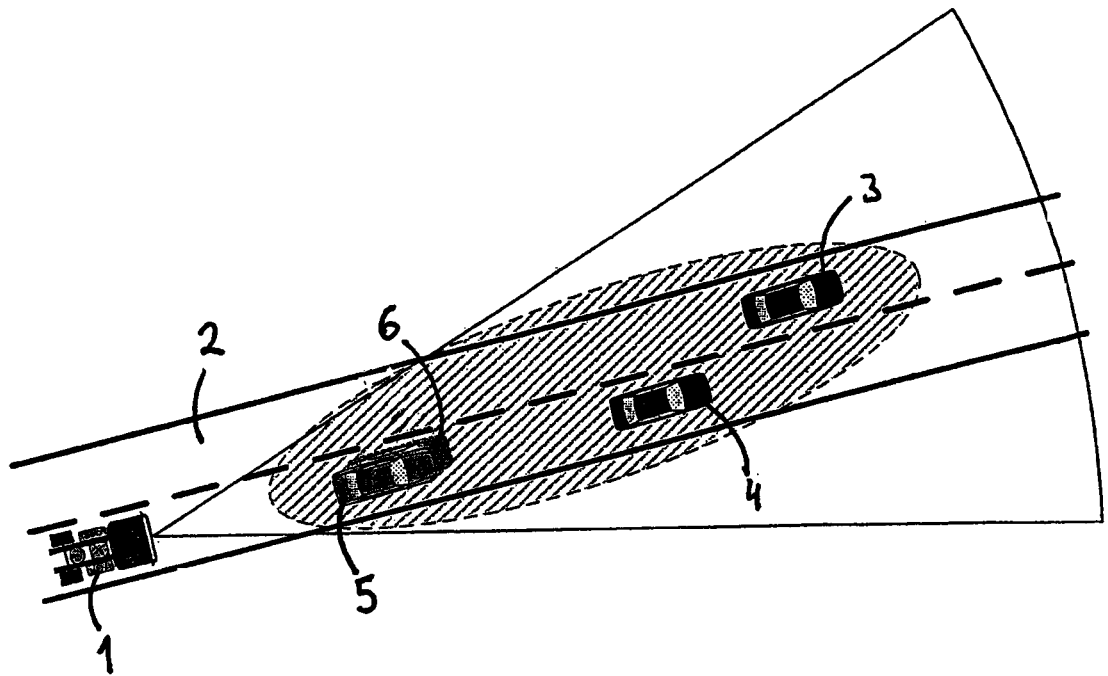
FIG. 1 shows an example of a situation where the system and method of the present invention can be used.

FIG. 1 is an overview of an example situation where a vehicle 1 equipped with an adaptive cruise control system is travelling on a road 2 with two lanes for traffic in the same direction. Also shown in the figure are three other vehicles, a first vehicle 3, a second vehicle 4 and a third vehicle 5. Partly overlapping and just slightly to the left and forward of the third vehicle 5 is a virtual target vehicle 6. The three vehicles 3, 4, 5 are treated as a group in the adaptive cruise control algorithm. In prior art algorithms a lead vehicle is chosen, generally the closest one, i.e. the third vehicle 5 in FIG. 1, regardless of whether a group of vehicles in front of the equipped vehicle is monitored or just the closest one.

The idea of the present invention is to track several vehicles at the same time and use all of them for adaptive cruise control purposes instead of selecting just one of them. A group of targets is more likely to behave "smoother" than a single individual member and their actions are also likely to be highly correlated. If for example the second vehicle 4 in FIG. 1 brakes we can expect that the third vehicle 5 will brake as well. If the opposite is valid, i.e. the second vehicle 4 accelerates, we can ignore non-eco driving actions by the third vehicle 5 by estimating how that driver adapts to its lead vehicle, i.e. the second vehicle.

A further example: the second vehicle 4 brakes, the third vehicle 5 brakes, and the second vehicle 4 thereafter accelerates. Traditional adaptive cruise control systems will adapt to the speed of the third vehicle 5 and brake. The system of the present invention uses the whole group, in this case the second 4 and third vehicle 5 as one target vehicle. Thus, the equipped vehicle 1 may also brake but most likely not to the same extent as the third vehicle 5 since it is expected to accelerate quite soon.

In the same way, instead of waiting for the third vehicle 5 to brake the system of the equipped vehicle 1 can now act in advance. Thus, if a high correlation is expected between the second 4 and third vehicle 5 it is possible to avoid or at least mitigate the braking action of the adaptive cruise control system host, i.e. the equipped vehicle 1, as the second vehicle 4 is expected to accelerate again. The system of the present invention is in one embodiment taking into account the correlation to traffic density and speed in different lanes.

The system and method according to the present invention differs from the prior art ones mainly when the information of two or more vehicles are used as input data in the inventive algorithm. If there is only one vehicle visible in front of the equipped vehicle 1 or if the closest vehicle in front of the equipped vehicle 1 does not act according to what normally expected there is no difference between the inventive system or the inventive method in its most basic form, and prior art. Thus, in some extreme cases, it might be a better alternative to have the adaptive cruise control system revert to a prior art system mode if the system does not recognise a specific situation. However, in the embodiments where a combination is made with a navigation system, it might be that the vehicle closest in front of the equipped vehicle is decreasing its speed due to that an exit from the road is coming up which could explain the uncorrelated behaviour. Thus, the vehicle equipped with a system according to the present invention can adjust its velocity taking into consideration not only the vehicle leaving the road but also the other vehicles in front of the vehicle soon to leave the road.

According to one embodiment of the present invention the system estimates the group properties based on the number of vehicles, the spread or length of the group, variability of positions in the group, and the group model adaption used for prediction purposes. From these parameters the adaptive cruise control algorithm decides on the allowed time-gap deviations.

In another embodiment an adaptive model is used to describe the covariance for all vehicles in the group. The movements of all vehicles is the used to predict the position and actions of a virtual vehicle 6 assuming a predictive control algorithm. It is also possible to model the driver interaction in general to understand and predict the virtual vehicle behaviour this case. The virtual vehicle could in an alternative embodiment be the vehicle closest in front of the equipped vehicle.

In yet another embodiment and as shown in FIG. 1, a virtual target vehicle 6 is created by the adaptive cruise control system that has a dynamic behaviour that resembles the group. If this virtual vehicle 6 is derived to have eco-driving properties, so will the equipped vehicle 1. The position of the virtual vehicle 6 slightly left of the third vehicle 5 shows that the system in this case takes the first vehicle 3 into consideration.

Figure 2:
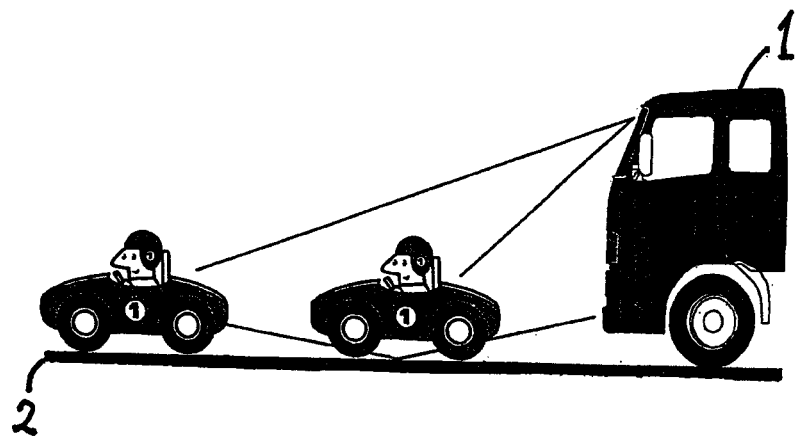
FIG. 2 shows how sensors could be mounted on a vehicle.

From FIG. 2 it can be seen that the truck platform is especially beneficial to the inventive approach as sensors can be mounted to see more than just the vehicle just in front of the equipped vehicle 1. Also illustrated is that radar often can see vehicles that seem covered due to the multipath behaviour of radar beams. Further, on a truck it is also possible to use camera for monitoring several vehicles since it is possible to mount it relatively high.

Yet another option is to monitor not only the vehicles in front of the equipped vehicle but also the ones coming up from the sides. Sometimes other vehicles travelling faster will overtake the equipped vehicle and might cut in just in front of the equipped vehicle. Unless the overtaking vehicle slows down the equipped vehicle could keep its velocity. It is easier for the system to handle this kind of situation if not only the vehicles in front are monitored.

The foregoing is a disclosure of an example practicing the present invention. However, it is apparent that method incorporating modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims. For instance, the virtual vehicle 6 may in some embodiments actually be chosen to be one of the "real" vehicles.

The invention claimed is:

1. An adaptive cruise control system for a motor vehicle comprising:
   a forward looking object detecting means arranged to simultaneously detect a group of a plurality of target objects moving in the predicted path and adjacent paths of the equipped vehicle, the means being further arranged to continuously monitor velocity and distance to each of the target objects;
   processing means arranged to process signals from the detecting means to provide information of distance to and relative speed of vehicles travelling in front of the equipped vehicle, wherein the processing means further is arranged to repeatedly generate velocity control signals based on the information of distance to and relative speed of vehicles travelling in front of the equipped vehicle; and
   means to control velocity of the equipped vehicle in response to the control signals from the processing means,
   wherein the processing means is further arranged to calculate a distance in time from the equipped vehicle to a virtual target vehicle, the distance to and velocity of the virtual target vehicle being calculated based on the vehicles in the group, the spread in distance of the group, and thus the vehicle density of the group, and the variability of position in the group, such that the algorithm of the processing means decides from the above parameters on the allowed deviations in time distance, wherein the processing, means is arranged to produce a signal to the means for controlling the velocity of the equipped vehicle that is based on the calculated distance in time between the equipped vehicle and the virtual vehicle.

2. An adaptive cruise control system according to claim 1, wherein the signal produced by the processing means to the means for controlling the velocity represents a value of the desired velocity.

3. An adaptive cruise control system according to claim 1, wherein the processing means is configured to calculate the covariance for all target objects within the detected group, which covariance is used in the algorithm for predicting the behaviour of the virtual target vehicle.

4. An adaptive cruise control system according to claim 1, wherein the object detecting means comprises a radar unit or a LIDAR unit or a camera unit for establishing a distance value and a velocity value for each of the detected target objects.

5. An adaptive cruise control system according to claim 1, wherein sensors are provided to measure a condition of the road surface.

6. An adaptive cruise control system according to claim 1, wherein the means to control velocity of the equipped vehicle in response to the control signals from the processing means comprises an engine control means and a brake control means.

7. An adaptive cruise control system according to claim 1, wherein the system is combined with a pre-crash system.

8. An adaptive cruise control system according to claim 1, wherein the system is combined with a navigation system.

9. An adaptive cruise control system according to claim 1, wherein the system further comprises means for monitoring vehicles laterally the equipped vehicle.

10. A method for controlling the velocity of a motor vehicle equipped with an adaptive cruise control system, comprising:
   simultaneously detecting a group of a plurality of target objects moving in the predicted path and adjacent paths of the equipped vehicle with a forward looking object detecting means;
   continuously monitoring velocity and distance to each of the target objects;
   processing, with a processing means the signals from the detecting means to provide information of distance to and relative speed of vehicles travelling in front of the equipped vehicle;
   using the processing means for repeatedly generating velocity control signals based on the information of distance to and relative speed of vehicles travelling in front of the equipped vehicle;
   controlling the velocity of the equipped vehicle in response to the control signals from the processing means;
   calculating a distance in time from the equipped vehicle to a virtual target vehicle, the distance to and velocity of the virtual target vehicle being calculated based on the vehicles in the group, the spread in distance of the group, and thus the vehicle density of the group, and the variability of positions in the group;
   deciding from the above parameters with the algorithm of the processing means on the allowed deviations in time distance; and
   producing a signal with the processing means to the means for controlling the velocity of the equipped vehicle that is based on the calculated distance in time between the equipped vehicle and the virtual vehicle.

11. A method according to claim 10, further comprising calculating, using the processing means, the covariance for all target objects within the detected group, which covariance is used in the algorithm for predicting the behaviour of the virtual target vehicle.

12. A method according to claim 10, comprising establishing a distance value and a velocity value for each of the detected target objects using a radar unit or a LIDAR unit or a camera unit.

13. A method according to claim 10, comprising measuring a condition of the road Surface using sensor means.

14. A method according, to claim 10, comprising predicting the velocity of a target vehicle using information from a navigation system.

* * * * *